(12) United States Patent
Sun et al.

(10) Patent No.: US 8,917,730 B2
(45) Date of Patent: Dec. 23, 2014

(54) DECODING METHOD AND APPARATUS

(75) Inventors: Hao Sun, Shenzhen (CN); Liguo Feng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 227 days.

(21) Appl. No.: 13/517,979

(22) PCT Filed: Jul. 20, 2010

(86) PCT No.: PCT/CN2010/075298
§ 371 (c)(1),
(2), (4) Date: Jun. 20, 2012

(87) PCT Pub. No.: WO2011/076006
PCT Pub. Date: Jun. 30, 2011

(65) Prior Publication Data
US 2012/0263150 A1 Oct. 18, 2012

(30) Foreign Application Priority Data
Dec. 25, 2009 (CN) .......................... 2009 1 0260238

(51) Int. Cl.
*H04L 12/28* (2006.01)
*H04L 1/00* (2006.01)
(52) U.S. Cl.
CPC ............ *H04L 1/0035* (2013.01); *H04L 1/0039* (2013.01); *H04L 1/0025* (2013.01)
USPC ........ 370/395.4; 370/252; 370/329; 370/342; 455/522; 455/439
(58) Field of Classification Search
None
See application file for complete search history.

(56) References Cited

U.S. PATENT DOCUMENTS

| | | | |
|---|---|---|---|
| 2005/0047416 A1* | 3/2005 | Heo et al. | 370/395.4 |
| 2005/0193315 A1* | 9/2005 | Bertinelli et al. | 714/758 |
| 2010/0220606 A1* | 9/2010 | Niwano | 370/252 |

FOREIGN PATENT DOCUMENTS

| | | |
|---|---|---|
| CN | 1516371 A | 7/2004 |
| CN | 1867168 A | 11/2006 |
| JP | 2003037583 A | 2/2003 |

OTHER PUBLICATIONS

International Search Report in international application No. PCT/CN2010/075298, mailed on Oct. 28, 2010.
English Translation of the Written Opinion of the International Search Authority in international application No. PCT/CN2010/075298, mailed on Oct. 28, 2010.

\* cited by examiner

*Primary Examiner* — David Oveissi
(74) *Attorney, Agent, or Firm* — Oppedahl Patent Law Firm LLC

(57) ABSTRACT

Method and apparatus for decoding is provided. A decoding channel IDentity (ID) of a Dedicated Physical Control Channel (DPCCH) and a decoding channel ID of an Enhanced DPCCH (E-DPCCH) of a user are acquired according to a user ID of the user; Transport Format Combination Indicator (TFCI) symbols in the DPCCH and Enhanced TFCI (E-TFCI) symbols in the E-DPCCH are de-mapped, and the de-mapped symbols are stored according to the decoding channel ID; and a symbol queue to be decoded is selected according to priorities of symbol queues of the DPCCH and the E-DPCCH, symbols corresponding to the selected symbol queue from the de-mapped symbols, and decoding the read symbols are read out.

9 Claims, 7 Drawing Sheets

DECODING METHOD AND APPARATUS

TECHNICAL FIELD

The disclosure relates to the field of wireless communications, and in particular to a decoding method and apparatus for hybrid processing on Transport Format Combination Indicator (TFCI) data in a Dedicated Physical Control Channel (DPCCH) and Enhanced-TFCI (E-TFCI) data in an E-DCH Dedicated Physical Control Channel (E-DPCCH).

BACKGROUND

In a Wideband Code Division Multiple Access (WCDMA) system, TFCI information needed for decoding a Dedicated Physical Data Channel (DPDCH) is contained in a DPCCH, wherein the TFCI data carried in the DPCCH is generated by coding and mapping 10-bit TFCI symbol information. The number of the coded symbols is 32, and the number of the TFCI symbols finally mapped in one DPCCH frame is 30, 32, 33, 36, 39 and 42. A control channel symbol-level processing includes: de-mapping the DPCCH symbols into 30 or 32 symbols, and then decoding the 30 or 32 symbols into the 10-bit TFCI information.

With the development of the 3rd Generation Partnership Project (3GPP), the WCDMA protocol has developed from Release 99 (R99) protocol to Release 6 (R6) protocol, and is still developing. In R6 protocol, communication speed becomes higher and higher, uplink high-speed services are added, and an E-DPCCH and an E-DCH Dedicated Physical Data Channel (E-DPDCH, wherein E-DCH refers to Enhanced Dedicated Channel) are accordingly added. E-TFCI information needed for decoding the E-DPDCH is contained in the E-DPCCH, and is similarly generated by coding and mapping 10-bit E-TFCI symbol information. Since there are two types of control channels, the DPCCH and the E-DPCCH, a new control channel symbol-level processing should further include de-mapping and decoding the E-DPCCH symbols.

In the prior art, a decoding speed is generally increased through optimization, or a decoding processing is carried out on either a DPCCH or an E-DPCCH, but no hybrid processing is carried out on both of them simultaneously. For instance, a fast decoding is carried out for either a control channel transport format (TFCI) or an enhanced control channel transport format (E-TFCI). However, at some times, some users have both a DPCCH and an E-DPCCH, or both a DPCCH and an E-DPCCH of a user need to be decoded. In this case, a fast decoding method for either a control channel transport format or an enhanced control channel transport format will arise some problems.

SUMMARY

The disclosure provides a decoding method and apparatus to address the problem that no solution to the hybrid processing of a DPCCH and an E-DPCCH has ever been provided in the prior art.

In order to address the problem above, in accordance with an aspect of the disclosure, there is provided a decoding method, which includes the following steps:

acquiring a decoding channel IDentity (ID) of a Dedicated Physical Control Channel (DPCCH) and a decoding channel ID of an Enhanced DPCCH (E-DPCCH) of a user according to a user ID of the user;

de-mapping Transport Format Combination Indicator (TFCI) symbols in the DPCCH and Enhanced TFCI (E-TFCI) symbols in the E-DPCCH, and storing the de-mapped symbols according to the decoding channel ID; and selecting a symbol queue to be decoded according to priorities of symbol queues of the DPCCH and the E-DPCCH, reading out symbols corresponding to the selected symbol queue from the de-mapped symbols according to the decoding channel ID of the selected symbol queue, and decoding the read symbols.

Furthermore, the step of acquiring a decoding channel ID of a DPCCH and a decoding channel ID of an E-DPCCH of a user according to a user ID of the user specifically may include:

configuring the decoding channel ID of the DPCCH and the decoding channel ID of the E-DPCCH of the user according to the user ID of the user before symbols of the DPCCH and the E-DPCCH arrive; and acquiring the decoding channel ID of the DPCCH and the decoding channel ID of the E-DPCCH of the user according to the user ID of the user when the symbols of the DPCCH and the E-DPCCH arrive.

Furthermore, the method may further include: after configuring the decoding channel ID of the DPCCH and the decoding channel ID of the E-DPCCH of the user, setting the decoding channel ID of the DPCCH and/or the decoding channel ID of the E-DPCCH to be decoded to be valid value(s), and setting the decoding channel ID of the DPCCH and/or the decoding channel ID of the E-DPCCH not to be decoded to be invalid value(s).

Furthermore, the method may include: before de-mapping the TFCI symbols in the DPCCH and the E-TFCI symbols in the E-DPCCH:

extracting the TFCI symbols from the DPCCH; and storing the extracted TFCI symbols and the E-TFCI symbols of the E-DPCCH.

Furthermore, the DPCCH may contain a 10 ms TFCI symbol queue, and the E-DPCCH contains a 2 ms E-TFCI symbol queue and a 10 ms E-TFCI symbol queue; wherein priorities of the 2 ms E-TFCI symbol queue, the 10 ms E-TFCI symbol queue and the 10 ms TFCI symbol queue are progressively lowered.

In another aspect, the disclosure further provides a decoding apparatus, which includes:

a decoding channel IDentity (ID) acquisition unit, configured to acquire a decoding channel ID of a Dedicated Physical Control Channel (DPCCH) and a decoding channel ID of an Enhanced DPCCH (E-DPCCH) of a user according to a user ID of the user;

a hybrid symbol de-mapping unit, configured to de-map Transport Format Combination Indicator (TFCI) symbols in the DPCCH and Enhanced TFCI (E-TFCI) symbols in the E-DPCCH;

a hybrid symbol storage unit, configured to store the symbols de-mapped by the hybrid symbol de-mapping unit according to the decoding channel ID;

a symbol extracting and decoding control unit, configured to select a symbol queue to be decoded according to priorities of symbol queues of the DPCCH and the E-DPCCH, and read out symbols corresponding to the selected symbol queue from the hybrid symbol storage unit according to the decoding channel ID of the selected symbol queue; and a decoding unit, configured to decode the symbols read out by the symbol extracting and decoding control unit.

Furthermore, the apparatus may further include:

a decoding channel resource pool, configured to, before the user sends a data frame of the DPCCH and a data frame of the E-DPCCH, configure the decoding channel ID of the DPCCH and the decoding channel ID of the E-DPCCH of the user according to the user ID of the user; and a decoding channel ID storage unit, configured to store the decoding channel IDs.

Furthermore, the apparatus includes:

a decoding channel ID setting unit, which is connected with the decoding channel resource pool, configured to set the decoding channel ID of the DPCCH and/or the decoding channel ID of the E-DPCCH to be decoded to be valid value(s), and to set the decoding channel ID of the DPCCH and/or the decoding channel ID of the E-DPCCH not to be decoded to be invalid value(s).

Furthermore, the apparatus may also include:

a TFCI symbol domain extraction unit, configured to extract the TFCI symbols from the DPCCH; and a hybrid symbol cache unit, configured to store the extracted TFCI symbols and the E-TFCI symbols of the E-DPCCH.

Furthermore, the symbol extracting and decoding control unit may further include:

a determination selection subunit, which is connected with the hybrid symbol de-mapping unit, configured to select the symbol queue to be decoded according to the priorities of the symbol queues of the DPCCH and the E-DPCCH; and an address analysis subunit, configured to analyze, according to the symbol queue selected by the determination selection subunit and the decoding channel ID corresponding to the selected symbol queue, a storage address of the symbols, which are obtained by de-mapping the symbol queue, in the hybrid symbol storage unit, and further to read out the symbols corresponding to the symbol queue from the hybrid symbol storage unit according to the storage address.

The disclosure has following advantageous effects:

The disclosure deals with the decoding of TFCI data in a DPCCH and the decoding of E-TFCI data in an E-DPCCH; and by configuring decoding channel IDs uniformly, the disclosure reduces nearly half of the symbol storage space. Additionally, by fractionizing the symbols to be decoded and selecting the symbols to be decoded according to the priorities for decoding, the disclosure further meets the requirements of Release 6 (R6) protocol on the demodulation delay of services.

DETAILED DESCRIPTION

In order to address the problem that a hybrid processing cannot be carried out for both a DPCCH and an E-DPCCH in the prior art, the disclosure provides a decoding method and apparatus, which will be described in detail below with reference to the accompanying drawings and embodiments. It should be appreciated that the specific embodiments described herein are merely illustrative, but not intended to limit the disclosure.

The disclosure focuses on how to perform a hybrid processing on data of the two types of channels for decoding, and how to save as many resources as possible during the hybrid processing on condition that the requirements of the 3GPP on the demodulation delay of different services are met. In accordance with the requirements of the 3GPP, the total delay of a high-speed service requiring a transmission time of 2 ms cannot be longer than 8.3 ms in a base station system, and the total delay of a high-speed service requiring a transmission time of 10 ms cannot be longer than 24.3 ms in a base station system.

Figure 1:
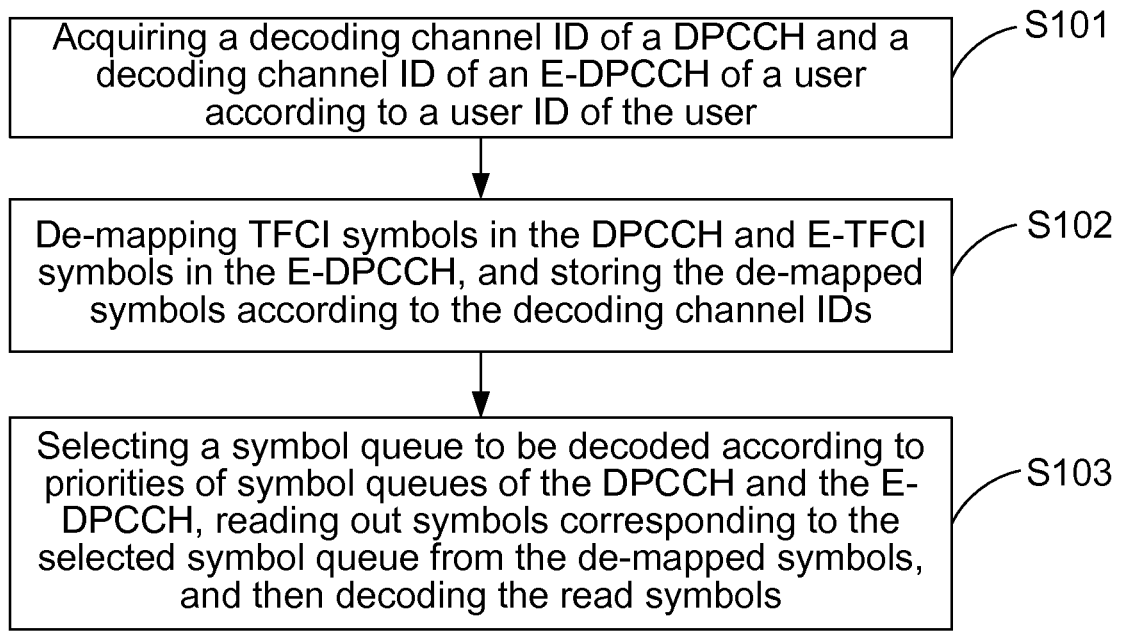
FIG. 1 is a flow chart illustrating a decoding method according to embodiment 1 of the disclosure.

As shown in FIG. 1, the decoding method provided in embodiment 1 of the disclosure includes the following steps:

Step S101: acquiring a decoding channel IDentity (ID) of a DPCCH and a decoding channel ID of an E-DPCCH of a user according to a user ID of the user.

The decoding channel ID is an IDentity for distinguishing data corresponding to different channels, wherein the different channels refer to channels of different users or different types of channels of the same user. The decoding channel ID can be acquired in any way that can distinguish data corresponding to different channels. For instance, a decoding channel ID corresponding to a DPCCH and a decoding channel ID corresponding to an E-DPCCH may be configured according to a user ID of a user before symbols of the DPCCH and the E-DPCCH arrive, and then the decoding channel IDs may be acquired according to the user ID of the user when the symbols of the DPCCH and the E-DPCCH arrive. Alternatively, a decoding channel ID corresponding to a DPCCH and a decoding channel ID corresponding to an E-DPCCH may be directly configured according to a user ID of a user when symbols of the DPCCH and the E-DPCCH arrive. As the decoding channel IDs are configured uniformly, space occupied for storage of decoded data is reduced to the greatest extent.

Step S102: de-mapping TFCI symbols in the DPCCH and E-TFCI symbols in the E-DPCCH, and storing the de-mapped symbols according to the decoding channel ID.

First, the TFCI symbols are extracted from the DPCCH and then stored in a cache area along with the E-TFCI symbols in the E-DPCCH, wherein the E-TFCI symbols are the only type of symbols in the E-DPCCH, so no extraction is needed; subsequently, the TFCI or the E-TFCI symbols are read out from the cache area and de-mapped to remove redundant symbols so as to obtain de-mapped symbols (that is, pre-mapping symbols); and at last, the obtained symbols are stored respectively according to the decoding channel ID corresponding to the de-mapped symbols.

Step S103: selecting a symbol queue to be decoded according to priorities of symbol queues of the DPCCH and the E-DPCCH, reading out symbols corresponding to the selected symbol queue from the de-mapped symbols, and then decoding the read symbols.

The DPCCH includes a 10 ms TFCI symbol queue, and the E-DPCCH includes a 2 ms E-TFCI symbol queue and a 10 ms E-TFCI symbol queue. Therefore when a hybrid processing is performed on the DPCCH and the E-DPCCH, there arises a problem that which symbol queue should be decoded first. In order to meet the requirements of R6 protocol and follow-up protocol(s), the symbol queues are sorted according to their priorities, and generally, the priorities of the 2 ms E-TFCI symbol queue, the 10 ms E-TFCI symbol queue and the 10 ms TFCI symbol queue are progressively lowered. Then, a symbol queue to be decoded is selected according to the priorities of the symbol queues, and the symbols corresponding to the selected symbol queue are read out from the de-mapped symbols according to the decoding channel ID of the selected symbol queue, and are decoded. After the decoding, the three types of symbol queues are rechecked according to their priorities, the symbol queue with the highest priority in non-empty queues is selected, and corresponding symbols are taken out according to the decoding channel ID of the selected symbol queue and are decoded. The above processing repeats until all symbol queues are decoded.

Figure 2:
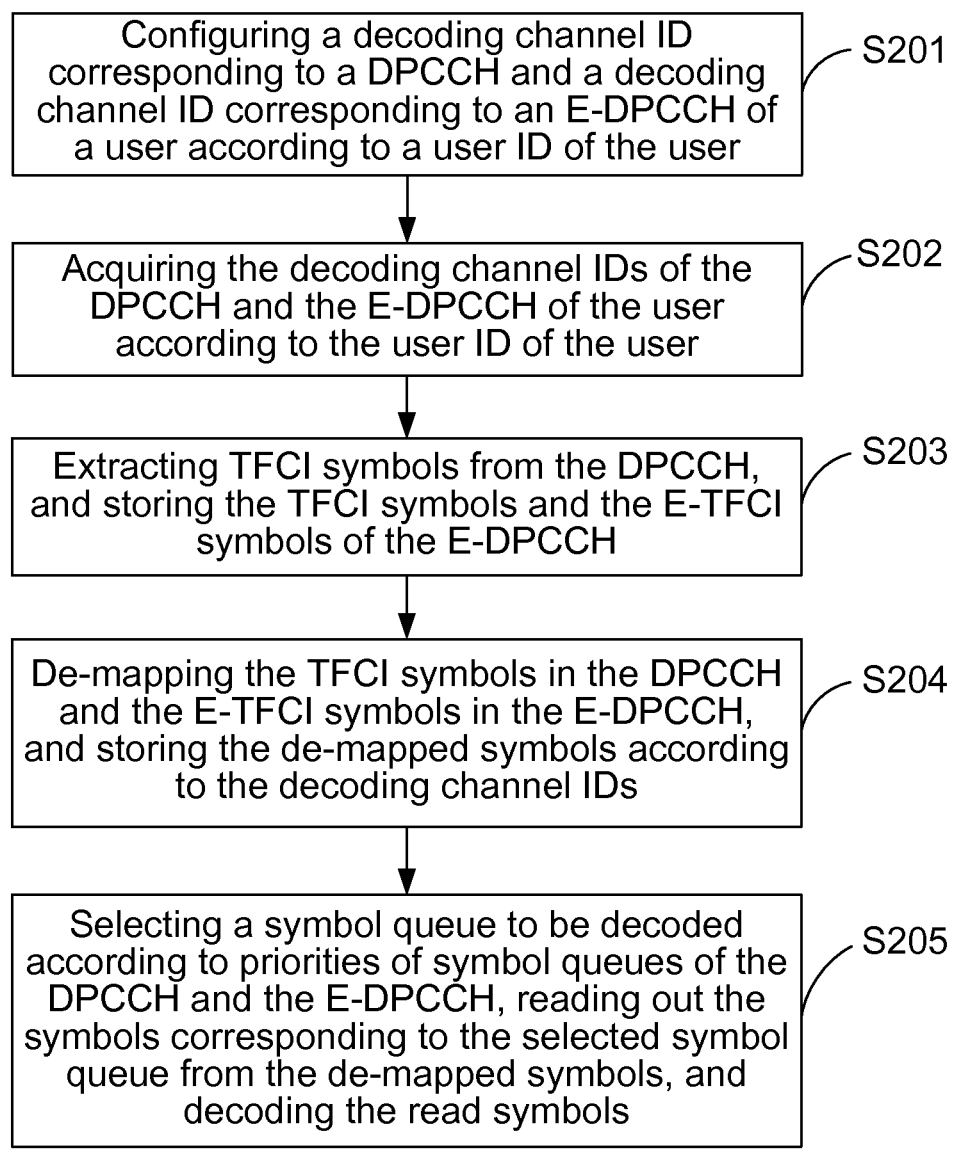
FIG. 2 is a flow chart illustrating a decoding method according to embodiment 2 of the disclosure.

As shown in FIG. 2, a decoding method provided in embodiment 2 of the disclosure includes the following steps:

Step S201: configuring a decoding channel ID corresponding to a DPCCH and a decoding channel ID corresponding to an E-DPCCH of each user before symbols of the DPCCH and the E-DPCCH arrive; that is, mapping relationship, between the user ID and the decoding channel IDs corresponding to the DPCCH and the E-DPCCH, is configured according to the user ID of the user and then is stored. Wherein, the decoding channel IDs of the DPCCH and the E-DPCCH of the same user are different, so that data corresponding to different channels of the user can be distinguished. For instance, if the user ID of a user is 0, then the decoding channel ID corresponding to the DPCCH configured for the user is A1, and the decoding channel ID corresponding to the E-DPCCH configured for the user is A2; if the user ID of a next user is 1, then the decoding channel ID corresponding to the DPCCH configured for the next user is B1, and the decoding channel ID corresponding to the E-DPCCH configured for the next user is B2; and similarly, the decoding channel IDs corresponding to the DPCCHs and the E-DPCCHs configured for all other users can also be configured.

The acquired decoding IDs are set. As not all users have two types of channels, and not both of the two types of channels of a user need decoding, the decoding channel ID(s) corresponding to the DPCCH and/or the E-DPCCH to be decoded are set to be valid value(s), while the decoding channel ID(s) corresponding to the DPCCH and/or the E-DPCCH not to be decoded are set to be invalid value(s). That is, if both the DPCCH and the E-DPCCH of a user are to be decoded, the decoding channel IDs corresponding to the DPCCH and the E-DPCCH are both set to be valid values; if either the DPCCH or the E-DPCCH is to be decoded, then the decoding channel ID of the channel to be decoded is set to be a valid value, and that of the other channel is set to be an invalid value.

As the decoding IDs are configured uniformly, the space occupied for storage of the decoded data is reduced to the greatest extent. Assuming that a total number of users in a system is M and a total number of decoding channels is N, then $N<<(M*2)$. As a user has only one decoding channel in most cases, during storing decoding symbols, a storage area taking decoding channel IDs as its index is far smaller than two separate storage areas taking user IDs as their indexes, which greatly saves the capacity of the storage area.

Step S202: when the symbols of the DPCCH and the E-DPCCH arrive, searching for the decoding channel ID corresponding to the DPCCH and the decoding channel ID corresponding to the E-DPCCH of the user, which sends the channel symbols, according to the user ID of the user; that is, acquiring the decoding channel IDs corresponding to the DPCCH and the E-DPCCH of the user.

Step S203: extracting TFCI symbols from the DPCCH, and storing the extracted TFCI symbols and E-TFCI symbols of the E-DPCCH.

Four types of symbols are contained in the DPCCH, that is, pilot for a channel estimation, TFCI for indicating a data format of a current frame, FeedBack Information (FBI) for being used by a closed loop transmit diversity on downlink, and Transmit Power Control (TPC) for transmitting a power control command needed by a downlink power control. Decoding processing needs only the TFCI symbols, therefore, it is needed to extract the TFCI symbols from the DPCCH according to the information carried in the symbol data of the DPCCH. Furthermore, as the E-DPCCH contains only E-TFCI symbols, no symbol domain extraction is needed. The extracted TFCI symbols and the E-TFCI symbols are transmitted to a hybrid symbol cache area. At this point, these two types of symbols are hybrid in an interleaved manner, that is, the symbols in a frame of a decoding channel are interleaved with those in a frame of another decoding channel.

Step S204: de-mapping the TFCI symbols in the DPCCH and the E-TFCI symbols in the E-DPCCH, and storing the de-mapped symbols according to the decoding channel ID.

First, the symbols in the hybrid symbol cache area are read out, and redundant symbols resulting from coding and mapping are processed. For a DPCCH, as some pre-mapping symbols may be repeatedly mapped, there may be some redundant pre-mapping symbols in the DPCCH. So de-mapping processing is to remove the redundant symbols to limit the symbols to 30 or 32 pre-mapping symbols. Then, the 30 or 32 pre-mapping symbols resulting from the de-mapping processing are stored in the hybrid symbol storage space according to the decoding channel ID corresponding to the DPCCH. For a 2 ms E-DPCCH, there are only 30 symbols and no redundant symbols, so no processing is conducted during the de-mapping processing, that is, the 30 symbols in the 2 ms E-DPCCH are taken as 30 de-mapped symbols and then stored in the hybrid symbol storage space according to the decoding ID corresponding to the E-DPCCH. For a 10 ms E-DPCCH, there are 150 symbols, wherein the 30 symbols in the first sub-frame of the five sub-frames of the E-DPCCH are original symbols (pre-mapping symbols), and the symbols of the following four sub-frames are all repeated symbols (redundant symbols), de-mapping processing is performed on the four repeated sub-frames to remove the redundant symbols; and at last, 30 de-mapped symbols are obtained and then the 30 pre-mapping symbols obtained from the 30 de-mapped symbols are stored in the hybrid symbol storage space according to the decoding ID corresponding to the E-DPCCH. The hybrid symbol storage space, the size of which is based on the total number of the resources in the decoding channel, is used for storing the 30 or 32 TFCI and/or E-TFCI symbols resulting from de-mapping each decoding channel. As symbols in a decoding channel are distributed in one frame, a frame of data should be synchronously acquired for decoding. Therefore, it is needed to store a frame of data in the hybrid symbol storage space and to read out the data synchronously after a last symbol in the decoding channel frame is stored.

A task is established when the last symbol in the frame is stored in the decoding channel; then an event is generated according to the type of the channel, and placed into one of three First Input First Output (FIFO) queues. The generation of a task event (symbol queue) indicates that the data of a channel frame is ready in the symbol storage space and can be taken out to be decoded, wherein the address of symbol data in the hybrid symbol storage space can be acquired from the decoding channel task queue. The three FIFO queues refer to a 2 ms E-DPCCH decoding channel task queue, a 10 ms E-DPCCH decoding channel task queue and a 10 ms DPCCH decoding channel task queue. A plurality of 2 ms E-TFCI symbol queues (task events) are stored in the 2 ms E-DPCCH decoding channel task queue, a plurality of 10 ms E-TFCI symbol queues (task events) are stored in the 10 ms E-DPCCH decoding channel task queue, and a plurality of 10 ms TFCI symbol queues (task events) are stored in the 10 ms DPCCH decoding channel task queue. A symbol queue (task event) includes the decoding channel ID of a decoding channel frame and the number of the de-mapped symbols, according to both of which the address of TFCI or E-TFCI data of a frame in the user channel in the hybrid symbol storage space can be acquired.

Step S205: selecting a symbol queue to be decoded according to the priorities of the symbol queues of the DPCCH and the E-DPCCH, reading out the symbols corresponding to the selected symbol queue from the de-mapped symbols, and then decoding the read symbols.

The TFCI of the DPCCH corresponds to a transmission format indicator of a data channel service in accordance with R99, the E-TFCI of the E-DPCCH corresponds to a transmission format indicator of a high-speed data channel service, wherein the high-speed service has two types: 2 ms frames and 10 ms frames. Different services have different requirements on delay, a priority processing on control channels is a guarantee for a priority processing on a data service channel, which is significantly beneficial for performance improvement of an uplink system. After the last symbol (the de-mapped symbol) in a frame is stored in the hybrid symbol storage space, the three types of symbols are stored respectively in the three task queues according to the types. Then, the requests of the three symbol queues are synchronously detected. If the three types of symbol queues exist synchronously, a task event in a task queue is selected according to the priorities of the queues and then processed; wherein the priorities of the 2 ms E-DPCCH, the 10 ms E-DPCCH and then 10 ms DPCCH are progressively lowered. After one task queue is selected, an address analysis is carried out on the content in the queue task so as to obtain a corresponding symbol storage address in the hybrid symbol storage space, and then the symbols are read out and decoded.

Figure 3:
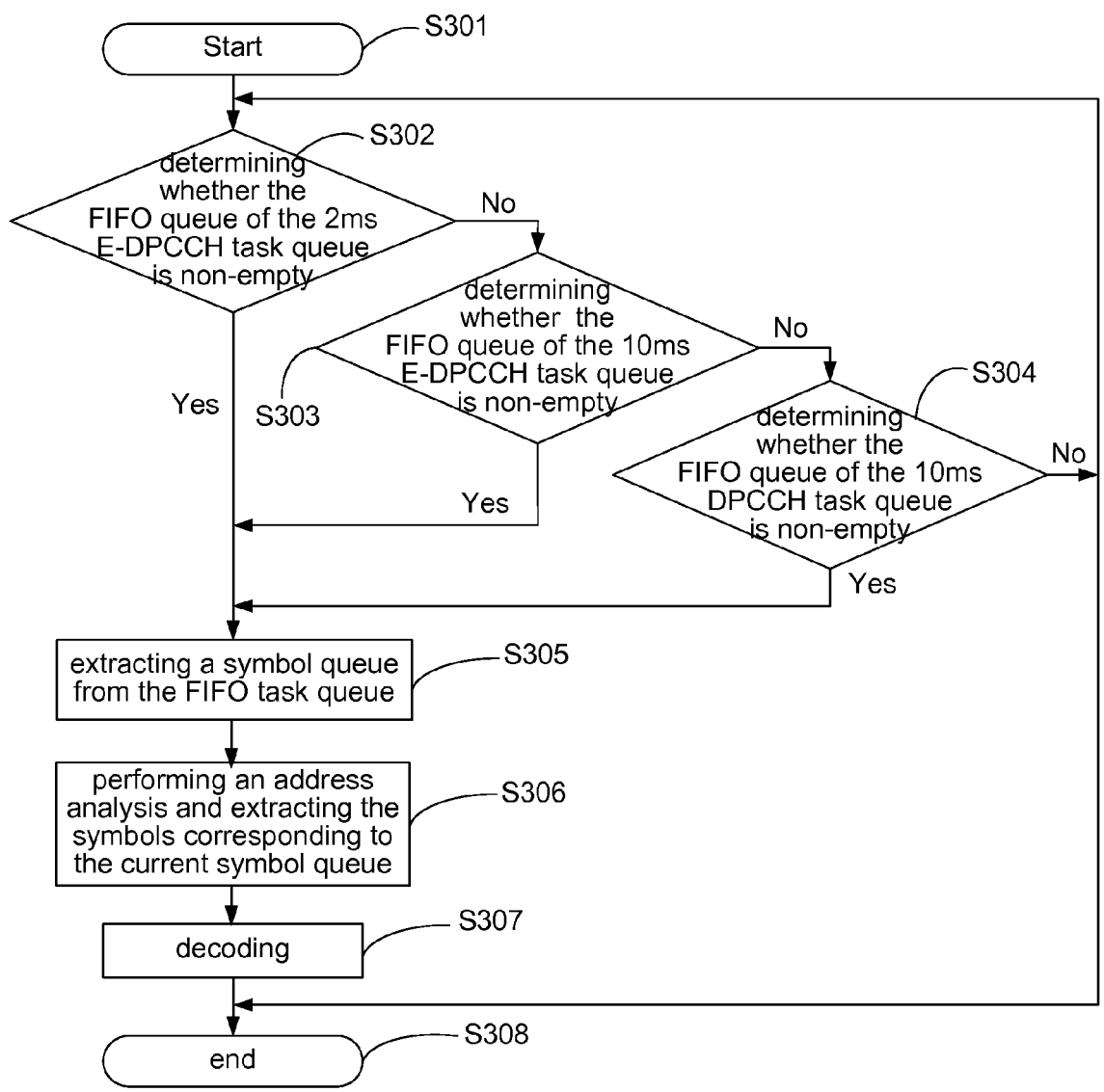
FIG. 3 is a flow chart showing a priority-based symbol queue selection and decoding processing according to embodiment 2 of the disclosure.

As shown in FIG. 3, the flow of a priority-based symbol queue selection and decoding processing specifically includes the following steps:

Step S301: start.

Step S302: determining whether the FIFO queue of the 2 ms E-DPCCH task queue is non-empty; if the FIFO queue of the 2 ms E-DPCCH task queue is non-empty, turning to Step S305; otherwise, turning to Step S303.

Step S303: determining whether the FIFO queue of the 10 ms E-DPCCH task queue is non-empty; if the FIFO queue of the 10 ms E-DPCCH task queue is non-empty, turning to Step S305; otherwise, turning to Step S304.

Step S304: determining whether the FIFO queue of the 10 ms DPCCH task queue is non-empty; if the FIFO queue of the 10 ms DPCCH task queue is non-empty, turning to Step S305; otherwise, turning to Step S302. Detecting and waiting are repeated if the FIFO queues of the three task queues are all empty, until at least one of the three task queues is non-empty.

Step S305: extracting a symbol queue from the FIFO queue of this task queue directly; that is, if the FIFO queue of the 2 ms E-DPCCH task queue is non-empty, extracting a 2 ms E-TFCI symbol queue directly; if the FIFO queue of the 2 ms E-DPCCH task queue is empty, while the FIFO queue of the 10 ms E-DPCCH task queue is non-empty, extracting a 10 ms E-TFCI symbol queue directly; and if the FIFO queues of the 2 ms E-DPCCH task queue and the 10 ms E-DPCCH task queue are both empty, while the FIFO queue of the 10 ms DPCCH task queue is non-empty, extracting a 10 ms TFCI symbol queue.

Step S306: acquiring, after a symbol queue is extracted, the address of TFCI or E-TFCI data of a frame in a channel of the user in the hybrid symbol storage space, according to the decoding channel ID in the corresponding decoding channel frame and the number of the de-mapped symbols contained in the symbol queue, and extracting 30 or 32 symbols according to the address.

Step S307: decoding the 30 or 32 extracted symbols to obtain a 10-bit TFCI or E-TFCI. After the selected symbol queue is decoded, turning to step S302.

Step S308: ending the decoding processing after all the symbol queues in the three task queues are decoded.

Figure 4:
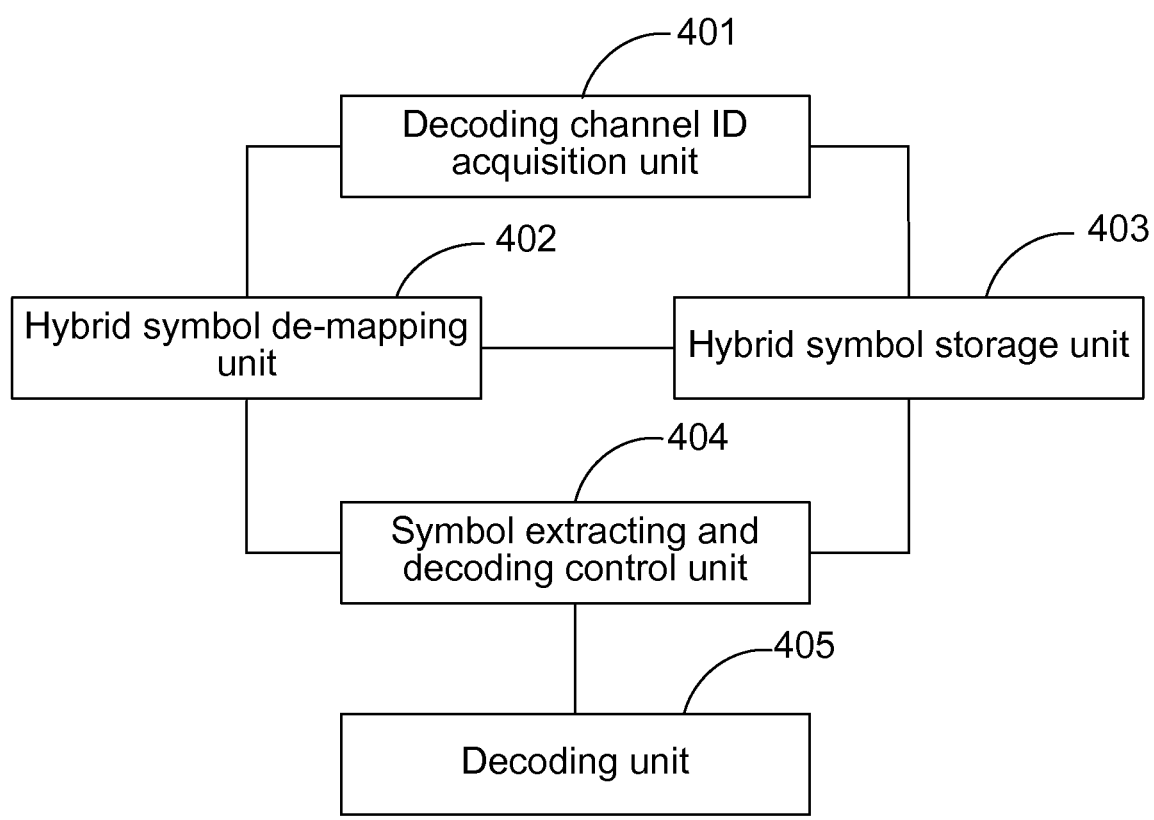
FIG. 4 is a schematic diagram illustrating a structure of a decoding apparatus according to embodiment 3 of the disclosure.

As shown in FIG. 4, a decoding apparatus provided in embodiment 3 of the disclosure includes:

A decoding channel ID acquisition unit 401, which is configured to acquire a decoding channel ID of a DPCCH and a decoding channel ID of an E-DPCCH of a user according to the user ID of the user. Wherein, the decoding channel ID is an identity for distinguishing data corresponding to different channels, the different channels refer to channels of different users or different types of channels of the same user. The decoding channel ID can be acquired in any way that can distinguish data corresponding to different channels A hybrid symbol de-mapping unit 402, which is connected with the decoding channel ID acquisition unit 401 and configured to de-map TFCI symbols in the DPCCH and E-TFCI symbols in the E-DPCCH. De-mapping the TFCI symbols in the DPCCH is removing the symbols which are repeatedly mapped in the DPCCH during a mapping process so as to obtain 30 or 32 pre-mapping symbols. De-mapping the E-TFCI symbols in the E-DPCCH includes: de-mapping the E-TFCI symbols in a 2 ms E-DPCCH and de-mapping the E-TFCI symbols in a 10 ms E-DPCCH. As there is no redundant E-TFCI symbols in the 2 ms E-DPCCH, the 30 symbols in the 2 ms E-DPCCH are just taken as the 30 de-mapped symbols. For the 10 ms E-DPCCH, there are 150 E-TFCI symbols, wherein the 30 symbols in the first sub-frame of the five sub-frames of the 10 ms E-DPCCH are original symbols (pre-mapping symbols), and the symbols of the following four sub-frames are all repeated symbols (redundant symbols); thus the de-mapping processing is performed on the four repeated sub-frames to remove the redundant symbols, and at last, 30 de-mapped symbols are obtained.

A hybrid symbol storage unit 403, which is connected with the hybrid symbol de-mapping unit 402 and configured to store the symbols de-mapped by the hybrid symbol de-mapping unit 402 according to the decoding channel ID. Storing the symbols according to the decoding channel ID includes: acquiring, according to the channel type of the user corresponding to the symbols, the decoding channel ID of a certain type of a channel of the user from the decoding channel ID acquisition unit 401; then storing the symbols de-mapped by the hybrid symbol de-mapping unit 402 according to the acquired decoding channel ID. That is, a mapping relationship between a storage address and a decoding channel ID is established, in other words, the stored symbols can be found according to the decoding channel ID.

A symbol extracting and decoding control unit 404, which is connected with the hybrid symbol de-mapping unit 402 and the hybrid symbol storage unit 403 respectively, and configured to select a symbol queue to be decoded according to the priorities of the symbol queues of the DPCCH and the E-DPCCH de-mapped by the hybrid symbol de-mapping unit 402, and then to read out the symbols corresponding to the symbol queue from the hybrid symbol storage unit 403 according to the decoding channel ID and the symbol number contained in the symbol queue.

A decoding unit 405, which is connected with the symbol extracting and decoding control unit 404, and configured to decode the symbols read out by the symbol extracting and decoding control unit 404.

Figure 5:
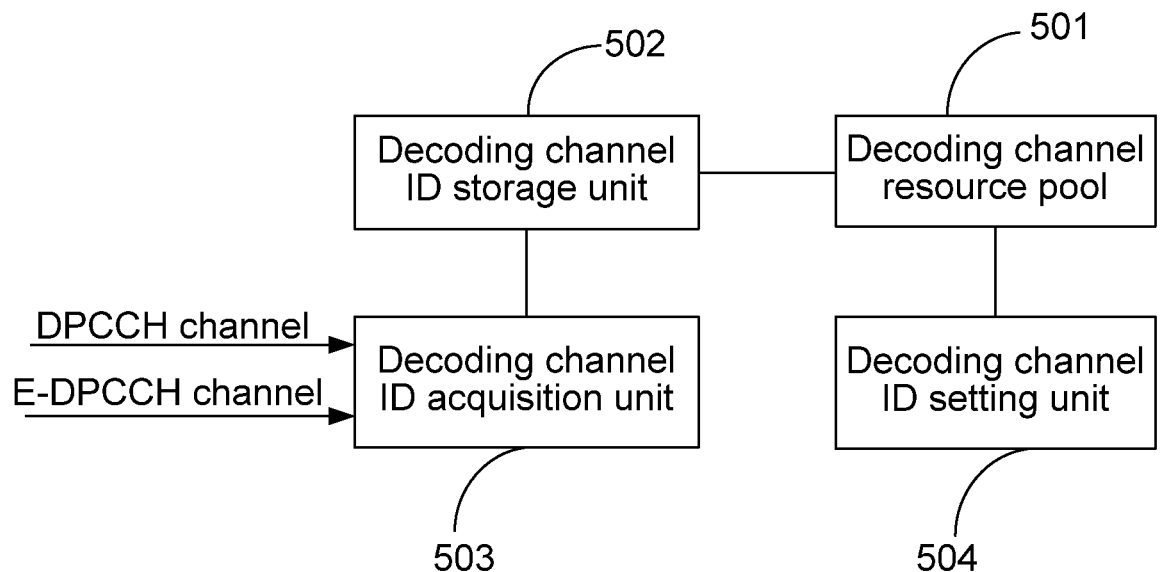
FIG. 5 is a schematic diagram illustrating a structure of a decoding channel ID acquisition unit of a decoding apparatus according to embodiment 4 of the disclosure.
Figure 6:
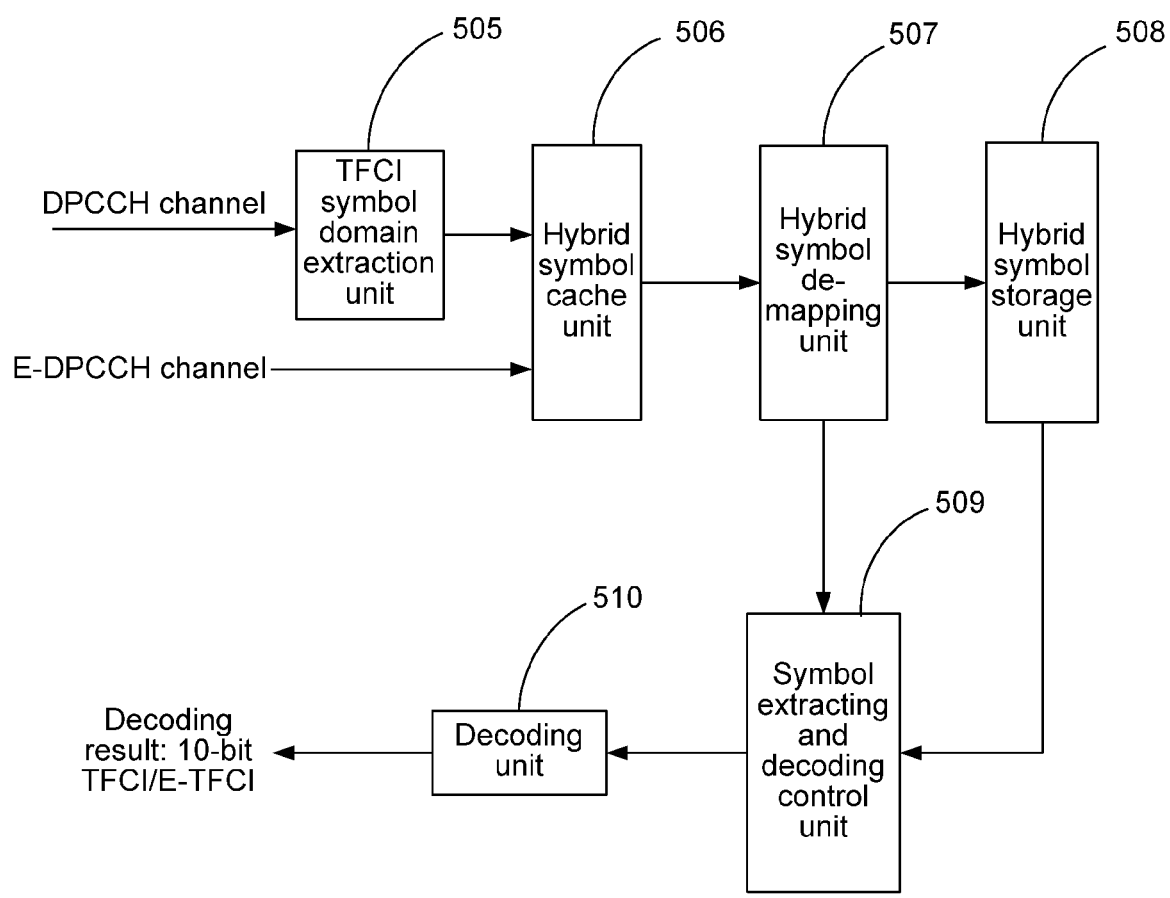
FIG. 6 is a schematic diagram illustrating a structure of a decoding unit of a decoding apparatus according to embodiment 4 of the disclosure.
Figure 7:
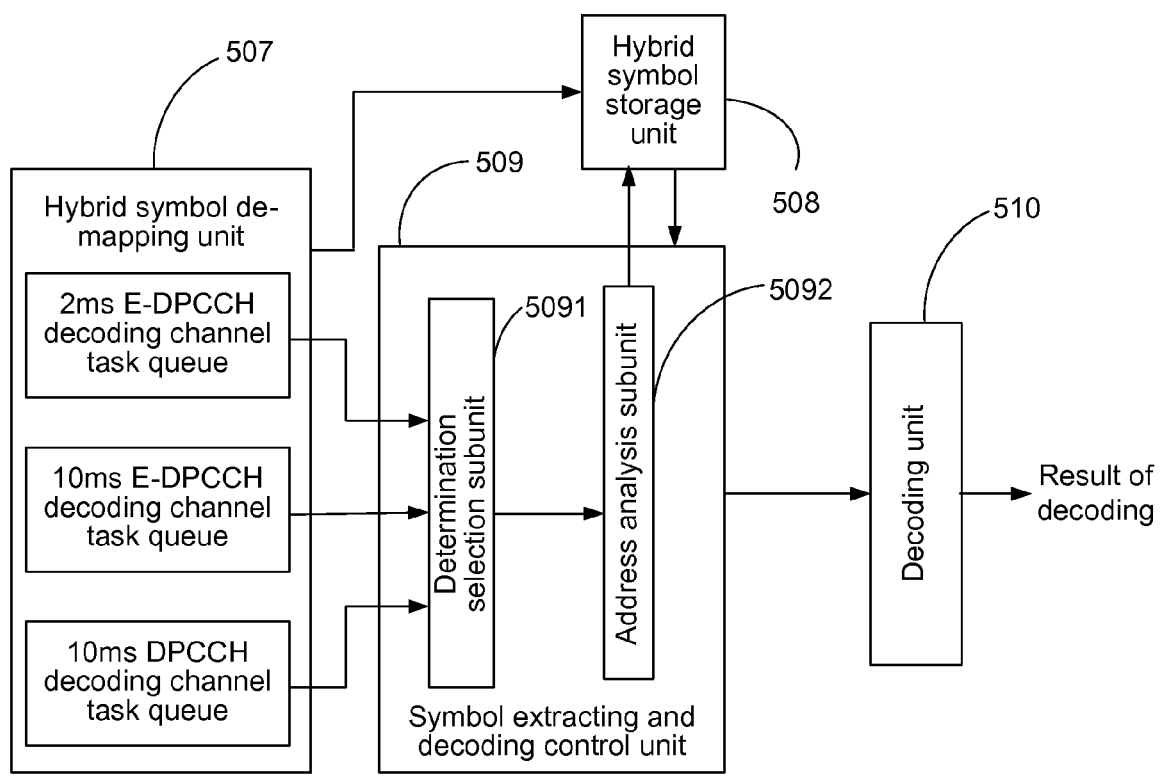
FIG. 7 is a schematic diagram illustrating a structure of a symbol extracting and decoding control unit of a decoding apparatus according to embodiment 4 of the disclosure.

As shown in FIGS. 5-7, a decoding apparatus provided in embodiment 4 of the disclosure includes: a decoding channel resource pool 501, a decoding channel ID storage unit 502, a decoding channel ID acquisition unit 503, a decoding channel ID setting unit 504, a TFCI symbol domain extraction unit 505, a hybrid symbol cache unit 506, a hybrid symbol de-mapping unit 507, a hybrid symbol storage unit 508, a symbol extracting and decoding control unit 509 and a decoding unit 510. Wherein the decoding channel ID setting unit 504, the decoding channel resource pool 501, the decoding channel ID storage unit 502 and the decoding channel ID acquisition unit 503 are connected in order; the TFCI symbol domain extraction unit 505, the hybrid symbol cache unit 506, the hybrid symbol de-mapping unit 507, the hybrid symbol storage unit 508, the symbol extracting and decoding control unit 509 and the decoding unit 510 are connected in order; and the hybrid symbol de-mapping unit 507 is connected with the decoding channel ID setting unit 504 and the symbol extracting and decoding control unit 509 respectively. The symbol extracting and decoding control unit 509 further includes a determination selection subunit 5091 and an address analysis subunit 5092.

Corresponding decoding channel IDs are configured for the DPCCH and the E-DPCCH of each user before symbols of the DPCCH and the E-DPCCH arrive. That is, the decoding channel resource pool 501 configures the mapping relationship between a user ID and the decoding channel IDs of the DPCCH and the EPCCH of the user, according to the user ID of the user. After the mapping relationship has been configured, the decoding channel ID setting unit 504 sets the decoding channel ID of the DPCCH and/or the decoding channel ID of the E-DPCCH of the user to be decoded to be valid value(s), and sets the decoding channel ID of the DPCCH and/or the decoding channel ID of the E-DPCCH not to be decoded to be invalid value(s). At last, the configured decoding channel IDs are stored in the decoding channel ID storage unit 502, wherein the decoding channel IDs of the DPCCH and the E-DPCCH of the same user are different for distinguishing the data corresponding to different types of the channels of the user.

When the symbols of the DPCCH and the E-DPCCH arrive, the decoding channel ID acquisition unit 503 acquires, through searching in the decoding channel ID storage unit 502, the decoding channel ID of the DPCCH and the decoding channel ID of the E-DPCCH of the user which sends the channel symbol data, according to the user ID of the user. The TFCI symbol domain extraction unit 505 extracts the TFCI symbols from the DPCCH and stores the extracted TFCI symbols in the hybrid symbol cache unit 506. As E-TFCI symbols are the only type of symbols in the E-DPCCH, the E-TFCI symbols are directly stored in the hybrid symbol cache unit 506. The hybrid symbol de-mapping unit 507 reads out the symbols from the hybrid symbol cache unit 506, and only de-maps the channel symbols whose decoding channel ID is a valid value set by the decoding channel ID setting unit 504, during the reading process. The 30 or 32 de-mapped symbols are obtained and stored in the hybrid symbol storage unit 508. The de-mapping process is identical to that given in embodiment 2 and is therefore omitted here. The hybrid symbol de-mapping unit 507 establishes a task after a last symbol in a frame of a decoding channel is stored in the decoding channel, and then generates a task event (symbol queue) according to the type of the channel and places the task event into one of the three FIFO queues. Wherein, the three FIFO queues refer to a 2 ms E-DPCCH decoding channel task queue, a 10 ms E-DPCCH decoding channel task queue and a 10 ms DPCCH decoding channel task queue. A plurality of 2 ms E-TFCI symbol queues are stored in the 2 ms E-DPCCH decoding channel task queue, a plurality of 10 ms E-TFCI symbol queues are stored in the 10 ms E-DPCCH decoding channel task queue, and a plurality of 10 ms TFCI symbol queues are stored in the 10 ms DPCCH decoding channel task queue. A symbol queue includes the decoding channel ID of a frame of the decoding channel and the number of de-mapped symbols, according to both of which the address of the TFCI or E-TFCI data of a frame in the user channel can be acquired from the hybrid symbol storage unit 508. The determination selection subunit 5091 of the symbol extracting and decoding control unit 509 selects a symbol queue from the three task queues of the hybrid symbol de-mapping unit 507 according to the priorities of the three task queues, and the address analysis subunit 5092 acquires the address of the TFCI or E-TFCI data of a frame in the user channel from the hybrid symbol storage unit 508 according to the decoding channel ID and the de-mapped symbol number contained in the symbol queue. The selection process is identical to that given in embodiment 2, and is therefore omitted here. The symbol extracting and decoding control unit 509 reads out the corresponding symbols from the hybrid symbol storage unit 508 according to the address, and then the decoding unit 510 decodes the symbols to obtain 10-bit TFCI or E-TFCI information as a decoding result.

It can be seen from the above embodiments that the disclosure deals with the decoding of TFCI information in a DPCCH and the decoding of E-TFCI information in an E-DPCCH synchronously, and reduces nearly half of the symbol storage space by configuring decoding channel IDs uniformly. Additionally, by fractionizing the symbols to be decoded and selecting the symbols to be decoded according to the priorities for decoding, the disclosure meets the requirements of R6 protocol on the demodulation delay of services.

Although the preferred embodiments of the disclosure are described for a purpose of illustration, it should be appreciated by those skilled in the art that various modifications, equivalents and alternatives can be devised, thus, the disclosure is not limited to the embodiments described above.

The invention claimed is:

1. A decoding method, comprising:
acquiring a decoding channel IDentity (ID) of a Dedicated Physical Control Channel (DPCCH) and a decoding channel ID of an E-DCH DPCCH (E-DPCCH) of a user according to a user ID of the user;
de-mapping Transport Format Combination Indicator (TFCI) symbols in the DPCCH and Enhanced TFCI (E-TFCI) symbols in the E-DPCCH, and storing the de-mapped symbols according to the decoding channel ID; and
selecting a symbol queue to be decoded according to priorities of symbol queues of the DPCCH and the E-DPCCH, reading out symbols corresponding to the selected symbol queue from the de-mapped symbols according to the decoding channel ID of the selected symbol queue, and decoding the read symbols,
wherein the DPCCH contains a 10 ms TFCI symbol queue, and the E-DPCCH contains a 2 ms E-TFCI symbol queue and a 10 ms E-TFCI symbol queue; wherein priorities of the 2 ms E-TFCI symbol queue, the 10 ms E-TFCI symbol queue and the 10 ms TFCI symbol queue are progressively lowered.

2. The decoding method according to claim 1, wherein the step of acquiring the decoding channel ID of the DPCCH and the decoding channel ID of the E-DPCCH of the user according to the user ID of the user comprises:
   configuring the decoding channel ID of the DPCCH and the decoding channel ID of the E-DPCCH of the user according to the user ID of the user before symbols of the DPCCH and the E-DPCCH arrive; and
   acquiring the decoding channel ID of the DPCCH and the decoding channel ID of the E-DPCCH of the user according to the user ID of the user when the symbols of the DPCCH and the E-DPCCH arrive.

3. The decoding method according to claim 2, wherein after configuring the decoding channel ID of the DPCCH and the decoding channel ID of the E-DPCCH of the user:
   setting the decoding channel ID of the DPCCH and/or the decoding channel ID of the E-DPCCH to be decoded to be valid value(s), and setting the decoding channel ID of the DPCCH and/or the decoding channel ID of the E-DPCCH not to be decoded to be invalid value(s).

4. The decoding method according to claim 1, further comprising: before de-mapping the TFCI symbols in the DPCCH and the E-TFCI symbols in the E-DPCCH,
   extracting the TFCI symbols from the DPCCH; and
   storing the extracted TFCI symbols and the E-TFCI symbols of the E-DPCCH.

5. A decoding apparatus, comprising:
   a decoding channel IDentity (ID) acquisition unit, configured to acquire a decoding channel ID of a Dedicated Physical Control Channel (DPCCH) and a decoding channel ID of an E-DCH DPCCH (E-DPCCH) of a user according to a user ID of the user;
   a hybrid symbol de-mapping unit, configured to de-map Transport Format Combination Indicator (TFCI) symbols in the DPCCH and Enhanced TFCI (E-TFCI) symbols in the E-DPCCH;
   a hybrid symbol storage unit, configured to store the symbols de-mapped by the hybrid symbol de-mapping unit according to the decoding channel ID;
   a symbol extracting and decoding control unit, configured to select a symbol queue to be decoded according to priorities of symbol queues of the DPCCH and the E-DPCCH, and read out symbols corresponding to the selected symbol queue from the hybrid symbol storage unit according to the decoding channel ID of the selected symbol queue; and
   a decoding unit, configured to decode the symbols read out by the symbol extracting and decoding control unit,
   wherein the DPCCH contains a 10 ms TFCI symbol queue, and the E-DPCCH contains a 2 ms E-TFCI symbol queue and a 10 ms E-TFCI symbol queue; wherein priorities of the 2 ms E-TFCI symbol queue, the 10 ms E-TFCI symbol queue and the 10 ms TFCI symbol queue are progressively lowered.

6. The decoding apparatus according to claim 5, further comprising:
   a decoding channel resource pool, configured to, before the user sends a data frame of the DPCCH and a data frame of the E-DPCCH, configure the decoding channel ID of the DPCCH and the decoding channel ID of the E-DPCCH of the user according to the user ID of the user; and
   a decoding channel ID storage unit, configured to store the decoding channel IDs.

7. The decoding apparatus according to claim 6, further comprising:
   a decoding channel ID setting unit, which is connected with the decoding channel resource pool, configured to set the decoding channel ID of the DPCCH and/or the decoding channel ID of the E-DPCCH to be decoded to be valid value(s), and to set the decoding channel ID of the DPCCH and/or the decoding channel ID of the E-DPCCH not to be decoded to be invalid value(s).

8. The decoding apparatus according to claim 5, further comprising:
   a TFCI symbol domain extraction unit, configured to extract the TFCI symbols from the DPCCH; and
   a hybrid symbol cache unit, configured to store the extracted TFCI symbols and the E-TFCI symbols of the E-DPCCH.

9. The decoding apparatus according to claim 5, wherein the symbol extracting and decoding control unit further comprises:
   a determination selection subunit, which is connected with the hybrid symbol de-mapping unit, configured to select the symbol queue to be decoded according to the priorities of the symbol queues of the DPCCH and the E-DPCCH; and
   an address analysis subunit, configured to analyze, according to the symbol queue selected by the determination selection subunit and the decoding channel ID corresponding to the selected symbol queue, a storage address of the symbols, which are obtained by de-mapping the symbol queue, in the hybrid symbol storage unit, and further to read out the symbols corresponding to the symbol queue from the hybrid symbol storage unit according to the storage address.

* * * * *